US012412250B2

(12) United States Patent
Keller et al.

(10) Patent No.: US 12,412,250 B2
(45) Date of Patent: Sep. 9, 2025

(54) RENDERING ALONG A SPACE-FILLING CURVE

(71) Applicant: NVIDIA Corporation, Santa Clara, CA (US)

(72) Inventors: Alexander Georg Keller, Berlin (DE); Carsten Alexander Waechter, Berlin (DE); Nikolaus Binder, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 420 days.

(21) Appl. No.: 18/076,954

(22) Filed: Dec. 7, 2022

(65) Prior Publication Data

US 2023/0419450 A1      Dec. 28, 2023

Related U.S. Application Data

(60) Provisional application No. 63/354,531, filed on Jun. 22, 2022.

(51) Int. Cl.
*G06T 5/70* (2024.01)
*G06T 1/20* (2006.01)
(Continued)

(52) U.S. Cl.
CPC ............... *G06T 5/70* (2024.01); *G06T 1/20* (2013.01); *G06T 7/90* (2017.01); *G06T 11/40* (2013.01);
(Continued)

(58) Field of Classification Search
CPC .... G06T 5/70; G06T 1/20; G06T 7/90; G06T 11/40; G06T 2207/20081; G06T 2207/20084
(Continued)

(56) References Cited

U.S. PATENT DOCUMENTS 7,760,202 B2 *   7/2010   Herken ................. G06T 15/506
                                                    345/611
2009/0147002 A1*  6/2009   Keller .................... G06T 15/06
                                                    345/426
(Continued)

OTHER PUBLICATIONS

Hilbert Space Filling Curve Based Scan-Order for Point Cloud Attribute Compression, by Jiafeng Chen, Lu Yu, Wenyi Wang, IEEE Transactions on Image Processing (vol. 31, 2022, pp. 4609-4621), Jan. 1, 2022 (Year: 2022).*

(Continued)

*Primary Examiner* — Jennifer Mehmood
*Assistant Examiner* — Heath E. Wells
(74) *Attorney, Agent, or Firm* — Leydig, Voit & Mayer, Ltd.

(57) ABSTRACT

In photorealistic image synthesis by light transport simulation, the colors of each pixel are an integral of a high-dimensional function. However, the functions to integrate contain discontinuities that cannot be predicted efficiently. In practice, the pixel colors are estimated by using Monte Carlo and quasi-Monte Carlo methods to sample light transport paths that connect light sources and cameras and summing up the contributions to evaluate an integral. Because of the sampling, images appear noisy when the number of samples is insufficient. A low discrepancy sequence provides sample locations and these sample locations can be enumerated (assigned or distributed to pixels) according to a space-filling curve superimposed on a pixel grid. Correlations of such combinations of space-filling curves and low discrepancy sequences are analyzed, and the presented algorithms reduce correlations, are deterministic, and may be executed for each pixel in parallel.

22 Claims, 14 Drawing Sheets

(51) Int. Cl.
  *G06T 7/90* (2017.01)
  *G06T 11/40* (2006.01)
(52) U.S. Cl.
  CPC .............. *G06T 2207/20081* (2013.01); *G06T 2207/20084* (2013.01)
(58) Field of Classification Search
  USPC ........................................................ 382/157
  See application file for complete search history.

(56) References Cited

U.S. PATENT DOCUMENTS

2009/0167763 A1* 7/2009 Waechter ................ G06T 15/40
    345/426
2019/0073750 A1* 3/2019 Appu .................... G06T 15/005

OTHER PUBLICATIONS

Perceptual error optimization for Monte Carlo rendering, by Chizhov, Vassillen, Georgiev, Iliyan, Myszkowski, Karol, Singh, Gurprit, ACM Transactions on Graphics, vol. 41, Issue 3, Jun. 2022, Article No. 26, pp. 1-17, Pub: Dec. 3, 2020 (Year: 2020).*
Super Sub-Nyquist Single-Pixel Imaging by Means of Cake-Cutting Hadamard Basis Sort, by Yu, Wen-Ka, Sensors (Basel, Switzerland), 19(19), 4122, DOI:: 10.3390/s19194122, Sep. 23, 2019 (Year: 2019).*
Belcour, L., et al., "Lessons Learned and Improvements when Building Screen-Space Samplers with Blue-Noise Error Distribution," arXiv:2105.12620v2, May 28, 2021.
Ahmed, A.G.M., et al., "Screen-space blue-noise diffusion of Monte Carlo sampling error via hierarchical ordering of pixels," ACM Trans.Graph. 39(6), 2020.
Georgiev, I., et al., "Blue-noise dithered sampling," ACM SIGGRAPH 2016 Talks, 2016.
Heitz, E., et al., "A low-discrepancy sampler that distributes Monte Carlo errors as a blue noise in screen space," In SIGGRAPH 2019 Talks, ACM, Los Angeles, 2019.
Keller, A., et al., "Parallel quasi-Monte Carlo integration by partitioning low discrepancy sequences," In Monte Carlo and Quasi-Monte Carlo Methods 2010, pp. 487-498, Springer 2012.
L'Ecuyer, P., et al., "Sorting methods and convergence rates for Array-RQMC: Some empirical comparisons," In Mathematics and Computers in Simulation, vol. 143 (2018).
Liu, H., et al., "Rank-1 lattices for efficient path integral estimation," Computer Graphics Forum 40(2), pp. 91-102, 2021.
Cools, R., et al., "Constructing embedded lattice rules for multivariate integration," SIAM Journal on Scientific Computing 28, 2162-2188 (2006).
Downey, A.B., "Generating pseudo-random floating-point values," (2007).
Faure, H., "Good permutations for extreme discrepancy," J. Number Theory 42, 47-56 (1992).
Faure, H., et al., "Generalized Halton sequences in 2008: A comparative study," ACM Transactions on Modeling and Computer Simulation 19(4), 15:1-15:31 (2009).
Goda, T., et al., "Construction-free median quasi-Monte Carlo rules for function spaces with unspecified smoothness and general weights," SIAM Journal on Scientific Computing 44(4), A2765-A2788 (2022).
Goda, T., et al., "A universal median quasi-Monte Carlo integration," arxiv 0(0), 0-0 (2022).
Goldberg, D., "What every computer scientist should know about floating-point arithmetic," ACM Computing Surveys 23(1), 5-48 (1991).
Grünschloβ L., et al., "(t-m-s)-nets and maximized minimum distance," Monte Carlo and Quasi-Monte Carlo Methods, 2008, pp. 395-409.
Grünschloβ, L., et al., "Enumerating quasi-Monte Carlo point sequences in elementary intervals," Monte Carlo and Quasi-Monte Carlo Methods 2010, pp. 399-408, Springer (2012).

Hickernell, F.J., et al., "Extensible lattice sequences for quasi-Monte Carlo quadrature," SIAM J., Sci. Comput. 22, 1117-1138 (2001).
Hickernell, F.J., et al., "Weighted compound integration rules with higher order convergence for all N," Numerical Algorithms 59, 161-183 (2012).
Hickernell, F.J., et al., "The existence of good extensible rank-1 lattices," Journal of Complexity 19, 286-300 (2003).
Hong, H.S., "Digital Nets and Sequences for Quasi-Monte Carlo Methods," PHD Thesis, Hong Kong Baptist University (2002).
Joe, S., et al., "Remark on algorithm 659: Implementing Sobol's quasirandom sequence generator," ACM Trans. Math. Softw. 29(1), 49-57 (2003).
Joe, S., et al., "Constructing Sobol' sequences with better two-dimensional projections," SIAM Journal on Scientific Computing 30(5), 2635-2654 (2008).
Joe, S., et al., "Notes on generating Sobol' sequences," Technical report, School of Mathematics and Statistics, University of New South Wales (2008).
Keller, A., "Myths of computer graphics," In H. Niederreiter (ed) Monte-Carlo and Quasi-Monte Carlo Methods 2004, pp. 217-243, Springer (2006).
Keller, A., "Quasi-Monte Carlo image synthesis in a nutshell," In J. Dick et al. (eds.) Monte-Carlo and Quasi-Monte Carlo Methods 2012, pp. 203-238, Springer (2013).
Keller, A., et al., "Construction of a rank-1 lattice sequence based on primitive polynomials," In G. Larcher et al. (eds.) Applied Algebra and Number Theory, pp. 204-215, Cambridge University Press (2014).
Keller, A., et al., "My favorite samples," In ACM SIGGRAPH 2019 Courses, SIGGRAPH 2019, pp. 15:1-15:271, ACM, New York, NY, USA (2019).
Keller, A., et al., "Advanced (quasi) Monte Carlo methods for image synthesis," In ACM SIGGRAPH 2012 Courses, SIGGRAPH 2012, Association for Computing Machinery, New York, NY, USA (2012).
Keller, A., et al., "Rendering along the Hilbert curve," In Z. Boetv et al. (eds) Advances in Modeling and Simulation: Festschrift for Pierre L'Ecuyer, pp. 319-332, Springer (2022).
Keller, A., et al., "The Iray light transport simulation and rendering system," CoRR abs/1705.01263 (2017).
Kritzer, P., et al., "Lattice rules with random n acheive nearly optimal O(n-a-1/2) error independently of the dimension," Journal of Approximation Theory 240, 96-113 (2019).
Leimkuhler, T., et al., "Deep point correlation design," ACM Trans. Graph. 38(6) (2019).
L'Ecuyer, P., et al., "A tool for custom construction of QMC and RQMC point sets," In International Conference on Monte Carlo and Quasi-Monte Carlo Methods in Scientific Computing, pp. 51-70, Springer (2022).
Maize, E., "Contributions to the Theory of Error Reduction in Quasi-Monte Carlo Methods," PHD thesis, The Claremont Graduate School (1980).
Maize, E., et al., "Accelerating the convergence of lattice methods by importance sampling-based transforrmtions," In L. Plaskota et al. (eds.) Monte Carlo and Quasi-Monte Carlo Methods 2010, Springer Proceedings in Mathematics & Statistics, vol. 23, pp. 557-572, Springer (2012).
Owen, A.B., "Monte Carlo extension of quasi-Monte Carlo," In Proceedings of the 1998 Winter Simulation Conference, pp. 571-577, IEEE Press (1998).
Owen, A.B., "On dropping the first Sobol' point," In A. Keller (ed.) Monte Carlo and Quasi-Monte Carlo Methods 2020, pp. 71-86, Springer International Publishing, Cham (2022).
Pan, Z., et al., "Super-polynomial accuracy of one dimensional randomized nets using the median-of-means," Mathematics of Computation 0(0), 0-0 (2022).
Paulin, L., et al., "Mastering sampling uniformity over projections," ACM Transactions on Graphics 41(4), 84:1-84:13 (2022).
Gerber, M., et al., "Sequential quasi-Monte Carlo," Journal of the Royal Statistical Society, Series B (Statistical Methodology) 77(3), 509-579 (2015).

(56) References Cited

OTHER PUBLICATIONS

Walker, A.J., "Fast generation of uniformly distributed pseudorandom numbers with floating-point representation," Electronics Letters 10, 533-534 (1974).

* cited by examiner

RENDERING ALONG A SPACE-FILLING CURVE

CLAIM OF PRIORITY

This application claims the benefit of U.S. Provisional Application No. 63/354,531 titled "Rendering Along the Hilbert Curve," filed Jun. 22, 2022, the entire contents of which is incorporated herein by reference.

BACKGROUND

In photorealistic image synthesis by light transport simulation, the colors of each pixel are computed by evaluating an integral of a high-dimensional function. While the functions to integrate are square-integrable and hence of finite energy, the functions contain discontinuities that cannot be predicted efficiently. In practice, the pixel colors are estimated by using Monte Carlo and quasi-Monte Carlo methods to sample light transport paths that connect light sources and cameras and summing up contributions for the samples to evaluate an integral. Because of the sampling, images appear noisy when the number of samples is insufficient. This is quite common when images need to be synthesized rapidly for real-time applications and when convergence is slow due to the intricacies of the integral evaluation. There is a need for addressing these issues and/or other issues associated with the prior art.

SUMMARY

Embodiments of the present disclosure relate to rendering along the Hilbert curve. A low discrepancy sequence provides points that may define sample locations and the sample locations can be enumerated (assigned or distributed to pixels) according to a space-filling curve superimposed on a pixel grid. Enumerating the samples of a low discrepancy sequence along the space-filling curve superimposed on the raster of pixels of an image achieves noise characteristics that are desirable with respect to the human visual system, especially at very low sampling rates. Enumerating the samples along the space-filling curve reduces inter-pixel correlations, is deterministic, and may be executed for each pixel in parallel to render an image. Furthermore, a predetermined number of sample locations may be enumerated for each pixel or the sampling may be progressive and may be limited by a time duration or quality metric or interrupted and continued.

Previous solutions for sampling that are deterministic use a low discrepancy sequence (e.g., Sobol's low-discrepancy sequence) to define sample locations. Such sequences feature s-dimensional points within an s-dimensional unit cube (interval) and the points are uniformly distributed within the unit cube. Discrepancy is one measure of the deviation from perfect uniformity and the rate of deviation of a sequence of points from perfect uniformity should be low.

A system, method, and computer readable medium are disclosed that enumerate samples of a low discrepancy sequence along a space-filling curve for the purpose of at least one of sampling and numerical integration. A system, method, and computer readable medium are described for synthesizing content. In an embodiment, a low discrepancy sequence of points is obtained, each point in the sequence is assigned to a sample of a plurality of samples according to a space-filling curve to produce sample locations associated with the content, and the content is synthesized using the sample locations.

In an embodiment, the low discrepancy sequence is at least one of a deterministic and randomized low discrepancy sequence. In an embodiment, the space filling curve may be at least one of a Morton, Hilbert, Moore, and Peano curve. In an embodiment, the space-filling curve defines an order of single integrals to compute. In an embodiment, the space-filling curve is a shortest route connecting the single integrals. In an embodiment, one dimension of the low discrepancy sequence is used to partition the low discrepancy sequence into multiple low discrepancy sequences, where each integral to compute is assign exactly one of the multiple low discrepancy sequences of the partitioned low discrepancy sequence. In an embodiment, each one of the multiple low discrepancy sequences is assigned to one pixel in the synthesized content.

In an embodiment, assignment of one of the multiple low discrepancy sequences of the partition of one low discrepancy sequence to an integral is performed by a permutation. In an embodiment, the permutation is at least one of an identity and $\phi_b^{-1}(j/N)$, where N is the number of integrals (e.g., pixel attributes) to compute and $0<=j<N$ and $\phi_b^{-1}$ is the inverse of the component of the low discrepancy sequence used to partition the low discrepancy sequence.

BRIEF DESCRIPTION OF THE DRAWINGS

The present systems and methods for enumerating samples of a low discrepancy sequence along a space filling curve are described in detail below with reference to the attached drawing figures, wherein.

DETAILED DESCRIPTION

Figure 1A:
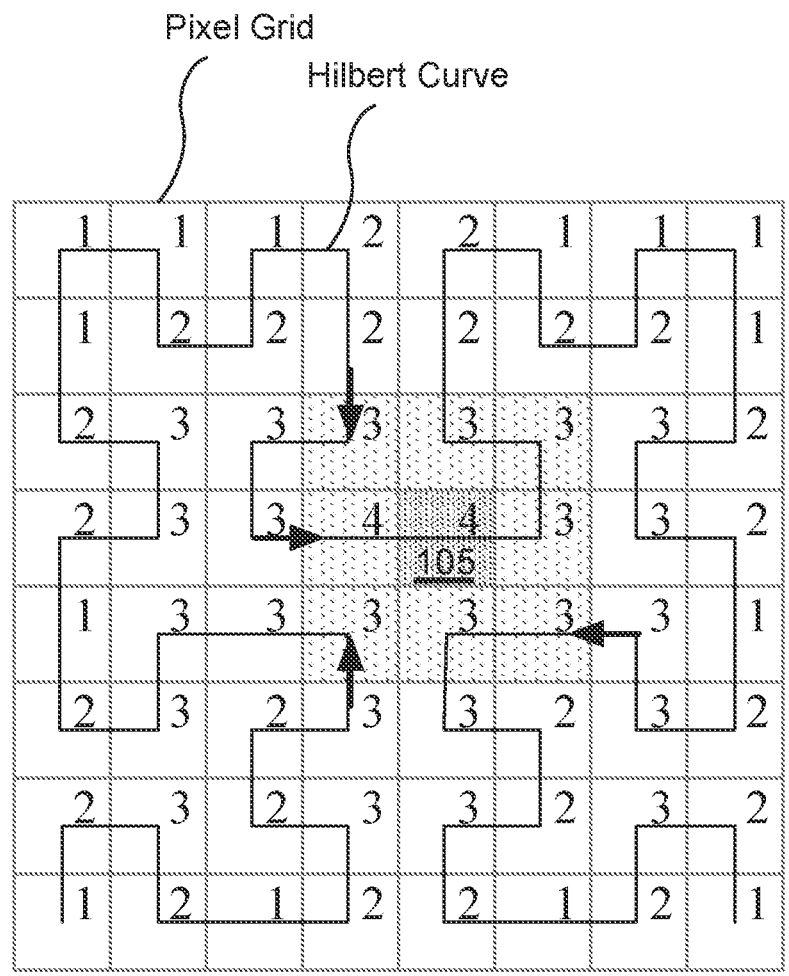
FIG. 1A illustrates a Hilbert curve superimposed on a pixel grid, in accordance with an embodiment.

Systems and methods are disclosed related to enumerating samples of a low discrepancy sequence along a space filling curve to map the points to light transport paths. Low discrepancy sequences feature s-dimensional points within an s-dimensional unit cube and the points are uniformly distributed within the unit cube. Discrepancy is a mathematical measure of the deviation from perfect uniformity and the deviation of the sequence of points from perfect uniformity should be low. The rate of the discrepancy of a low discrepancy (measure of deviation from perfect uniformity) is, roughly speaking, $1/N$, where N is the number of points. Points derived from a low discrepancy sequence are correlated, whereas random points are not correlated and can only achieve a discrepancy rate of $1/\sqrt{N}$.

A first set of dimensions of each s-dimensional point may be used as a vector to define a sample location within a pixel. A second set of dimensions of each s-dimensional point may be used as a vector to define a how light is scattered. A third set of dimensions of each s-dimensional point may be used as a vector to define a point on a light source. In an embodiment, each set of dimensions includes at least one dimension. Embodiments of the present disclosure relate to rendering along the Hilbert curve to produce digital content, such as synthesized images. As compared to the state of the art, the sample enumeration technique described herein does not require randomization, nor costly optimization, nor lookup tables.

The success of image compression algorithms and compressive sensing methods clearly indicates that the pixels of an image are not independent integrals. In photorealistic image synthesis by light transport simulation, an attribute (e.g., color) of each pixel is an integral of a high-dimensional function. In other words, an integral of a high-dimensional function associated with a light transport path is computed for each sample location. One way to account for the correlation of pixels is to consider image synthesis an integro-approximation problem. As described further herein, content, such as images may be synthesized as a sequence of correlated integrals such that noise is less perceivable by the human visual system.

The human visual system is quite capable of recovering information from noisy images and computer graphics has been taking advantage of that since its early days. Inspired by the arrangement of receptors in a monkey's retina, a huge body of work around sampling patterns with blue noise characteristics emerged. Noise is very amenable to the human visual system as aliases are mapped to noise, especially at low sampling rates and in low dimensions. Conventionally, an important detail had not been considered explicitly: blue noise characteristics of samples do not matter much for a single pixel integral compared with observing an ensemble of neighboring pixels. In other words, blue noise characteristics are important across a pixel region, but not so within individual pixels. Only recently, it was found that applying a per-pixel rotation of one generic set of samples can dramatically improve the perceived image quality, although the $\ell^2$-error remains about the same. The visual improvements have been attributed to blue noise characteristics. Because the $\ell^2$-error between a reference image and different sampling schemes remains about the same, the improvement in perceived image quality results from a distribution of the error and how the samples are correlated across the pixels. Therefore, a simple deterministic quasi-Monte Carlo algorithm, such as described further herein, may result in similar visual improvements.

FIG. 1A illustrates a Hilbert curve superimposed on a pixel grid, in accordance with an embodiment. The Hilbert curve starts in the bottom left and ends in the bottom right of the pixel grid. Samples are assigned to pixels in an order defined by the Hilbert curve. Each sample location is defined by a point in a low discrepancy sequence. When a fixed number of samples per pixel is used, the fixed number of points in the low discrepancy sequence is assigned to a first pixel in the space-filling curve, the next fixed number of points in the low discrepancy sequence is assigned to the second pixel . . . and so on. When progressive sampling is used, in one embodiment, a first point in the low discrepancy sequence is assigned to a first pixel in the space-filling curve, the second point in the low discrepancy sequence is assigned to the second pixel . . . and so on. The assignment of the points may be performed in parallel for all pixels to generate a plurality of sample locations for the pixels. When all pixels have been assigned a single sample, the process repeats to assign an additional sample to each pixel.

A number of segments of the space-filling curve enter a 3×3 pixel region including a center pixel 105. Four dark arrows indicate the four segments that enter the pixel region and the center pixel 105 is annotated with a number four. Each pixel in the pixel grid is annotated with the number of segments that enter a pixel region centered on the pixel. The Hilbert curve has a maximum number of segments intersecting each region that is less than the maximum compared with using other space-filling curves, such as the Morton and Peano curves. The Hilbert curve has a maximum number of segments intersecting each pixel region that equals the maximum compared with the Moore curve. A lower number of segments intersecting each pixel region is associated with a more uniform sample distribution which is desirable. Unlike the Morton curve, the Hilbert, Moore, and Peano curves only pass through neighboring pixels (horizontally or vertically aligned adjacent pixels, but not diagonally aligned pixels), and therefore realize shortest routes of visiting all pixels in the sense of the Traveling Salesman problem.

Enumerating low discrepancy sequences along space filling curves by spatial proximity suggests that contiguous blocks of samples from a low discrepancy sequence are spatially close and hence improve local uniformity. Similarly, using a variant of the Morton curve, combined with scrambling to enumerate pixels, results in an error more uniformly distributed across the image. Observable improvements in image quality are supported by the fact that the low discrepancy of a point sequence is preserved when enumerated along the Hilbert curve. In addition, considering an image as a line of pixels as enumerated along the Hilbert curve and assuming the function to be integrated along the pixel to have a gradient bounded by K, the total variation is bounded by K times the length of the Hilbert curve, which in turn bounds the integration error by the Koksma-Hlawka inequality. While the Hilbert, Moore, or Peano curve achieves a shortest route to connect all pixels, the Morton curve fails to do so, and produces images of lower visual quality. As compared to the Morton and Peano curve, both the Hilbert and Moore curve expose a smaller maximum number of curves segments in the 3×3 pixel region (i.e., neighborhood of a pixel), resulting in more consecutive samples of the low discrepancy sequence in the neighborhood, which improves uniformity locally.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

A deterministic algorithm may be used for image synthesis by enumerating a low discrepancy sequence along a space-filling curve, such as the Hilbert curve. Given the resolution of the image to synthesize, a deterministic low discrepancy sequence, and a number of samples to be drawn per pixel, the deterministic algorithm enumerates the samples per pixel begins by selecting a resolution of the space-filling curve to match the image resolution. In an embodiment, the smallest power of two that is larger or equal to the maximum of the image resolution in horizontal and vertical direction is determined. Enumerating the pixels along the space-filling curve, a predetermined number of samples for each pixel is drawn from the low discrepancy sequence in contiguous blocks. In an embodiment, an index of a pixel along the space-filling curve may be computed directly. In one embodiment, computing the index directly can be used to avoid the enumeration of pixels outside the image when the image dimensions and the resolution of the space-filling curve mismatch. In an embodiment, indices of the pixels indicate an order in which samples of the pixels are enumerated according to the space-filling curve. In an embodiment, an index is incremented for each pixel along the space-filling curve.

Figure 1B:
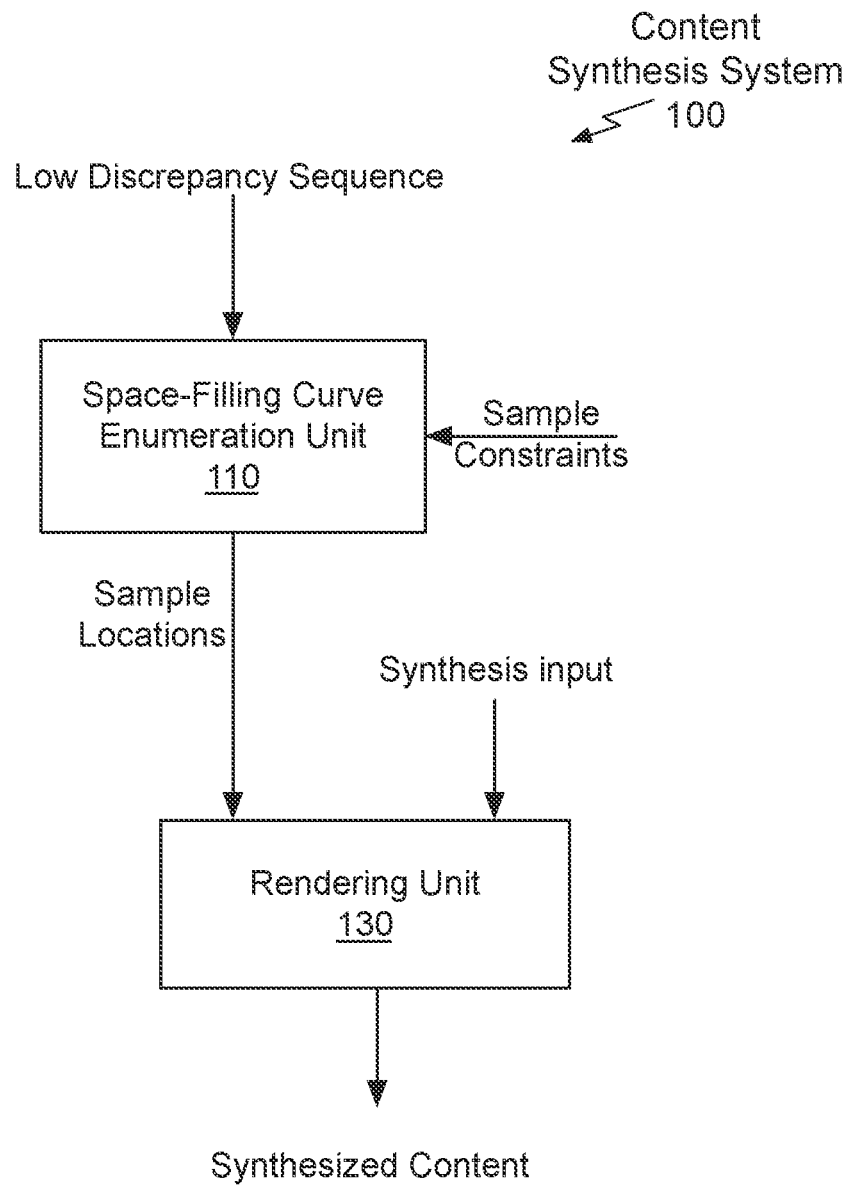
FIG. 1B illustrates a block diagram of an example content synthesis system suitable for use in implementing some embodiments of the present disclosure.

FIG. 1B illustrates a block diagram of an example content synthesis system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the content synthesis system 100 is within the scope and spirit of embodiments of the present disclosure.

The content synthesis system 100 includes a space-filling curve enumeration unit 110 and a rendering unit 130. The space-filling curve enumeration unit 110 receives a low discrepancy sequence and sample constraints. The sample constraints comprise a space-filling curve selection, a sampling mode as fixed or progressive, and one or more of image dimensions, a number of samples per pixel, time duration, etc.

The points are assigned to pixels in an order defined by the space-filling curve to generate sample locations. When the sampling mode is fixed, the fixed number of points (e.g., vectors) in the low discrepancy sequence is assigned to each pixel in an order defined by the space-filling curve to map the points to the pixels, thereby enumerating sample locations. When progressive sampling is used, in one embodiment, a first point in the low discrepancy sequence is assigned to a first pixel in the space-filling curve, the second point in the low discrepancy sequence is assigned to the second pixel . . . and so on. When all pixels have been assigned a single point, the process repeats to assign an additional point to each pixel. The assignment of the points may be performed in parallel for all pixels to compute the sample locations for either sampling mode.

The rendering unit 130 receives the sample locations and synthesis input. The synthesis input may comprise at least one of a camera description and a sensor description, a description of the geometry of the scene, at least one description of a light source, and a description of the physical properties of both the surfaces and volumes in the scene. In an embodiment, the sample locations correspond to light transport paths and the rendering unit 130 synthesizes the synthesis input using light transport simulation. In an embodiment, the sample locations correspond to sub-pixel coordinates and the rendering unit 130 synthesizes the synthesis input using rasterization. The sample constraints control which point of a low discrepancy sequence is assigned to a particular pixel.

Figure 1C:
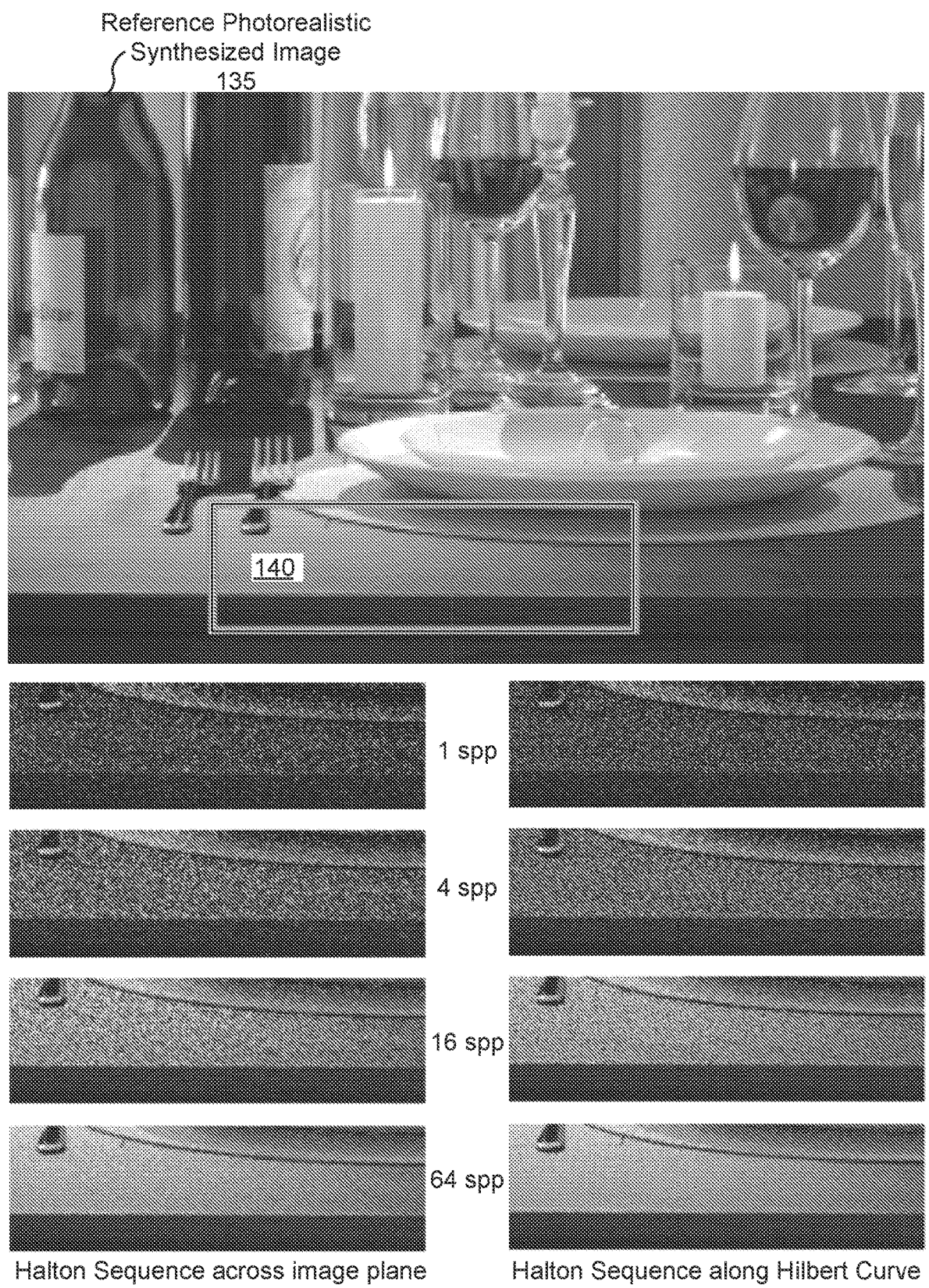
FIG. 1C illustrates a reference photorealistic synthesized image and portions of content synthesized using different techniques and numbers of samples per pixel, in accordance with an embodiment.

FIG. 1C illustrates a reference photorealistic synthesized image 135 and portions of content synthesized using different techniques and numbers of samples per pixel, in accordance with an embodiment. The reference photorealistic synthesized image 135 is rendered using 100,000 samples per pixel. A portion 140 of the reference photorealistic synthesized image 135 is rendered by enumerating one low-discrepancy Halton sequence across an image plane at 1, 4, 16, and 64 samples per pixel, using the first two dimensions of each point in the Halton sequence to sample the pixels as described in "Enumerating Quasi-Monte Carlo Point Sequences in Elementary Intervals" by L. Grünschloß, M. Raab, and A. Keller in "Monte Carlo and Quasi-Monte Carlo Methods 2010" edited by L. Plaskota and H. Woźniakowski, Springer 2012, pages 399-408. The portion 140 is also rendered by enumerating the low-discrepancy Halton sequence along the Hilbert curve at 1, 4, 16, and 64 samples per pixel. Enumerating samples of a low discrepancy sequence along a space-filling curve performs very well in terms of quality compared with using the first two dimensions of the same low discrepancy sequence to sample the pixels. While both approaches expose about the same $\ell^2$-error, sampling along a space-filling curve—particularly the Hilbert curve, results in noise that is much more uniformly distributed across the image. The improvements in quality are especially visible at low sampling rates.

The human visual system always tries to detect scale invariant features and pitifully finds such in the non-uniformities of noise, too. As such features are not related to the actual image content, they are perceived as disturbing artifacts. If, however, the noise is uniform it is less likely misinterpreted and consequently noise is not perceived as much. The more uniformly distributed and less splotchy appearance of the sampling noise is especially visible in areas of the rendered portion 140 that appear smooth at higher sampling rates, such as the table top in the portion 140. When the portion 140 is rendered by enumerating the samples along the Hilbert curve, the noise is more uniformly distributed compared with enumerating the points across the image plane. The human visual system naturally integrates over areas of more uniform noise, so the portions 140 that are rendered by enumerating the samples along the Hilbert curve are perceived to be of higher quality. The observable differences are reduced as the number of samples per pixel increases. Nevertheless, the improvement in image quality very much matters when only a small number of samples are affordable, such as in real-time rendering.

Figure 2A:
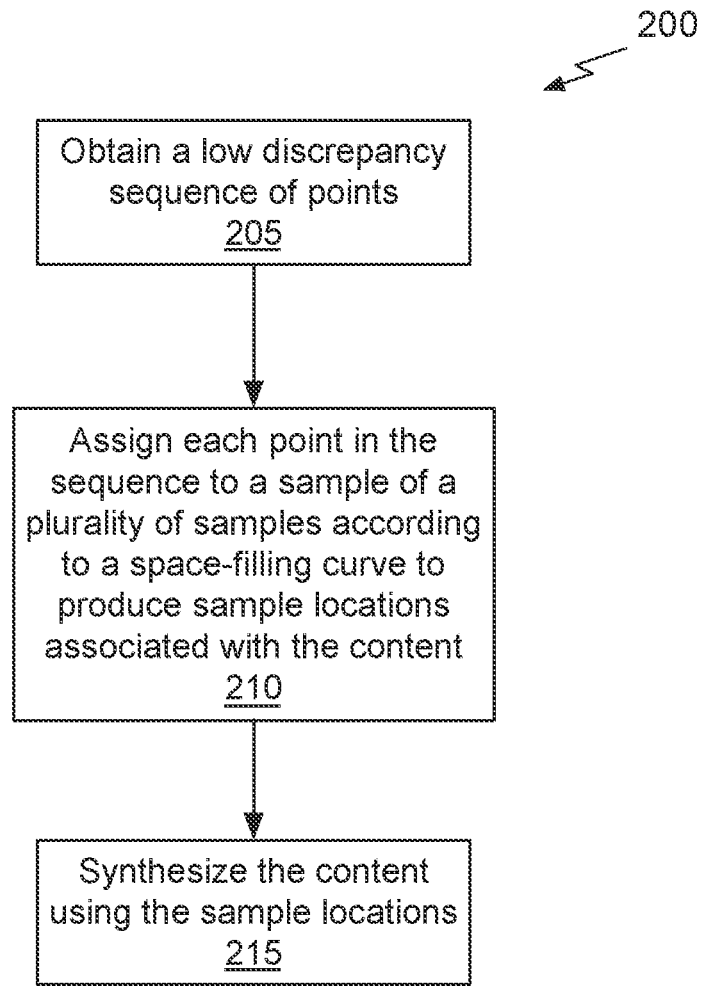
FIG. 2A illustrates a flowchart of a method for synthesizing content, in accordance with an embodiment.

FIG. 2A illustrates a flowchart of a method 200 for synthesizing content, in accordance with an embodiment. Each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the content synthesis system 100 of FIG. 1B. However, this method may additionally or alternatively be executed by any one system, or any combination of systems, including, but not limited to, those described herein. Furthermore, persons of ordinary skill in the art will understand that any system that performs method 200 is within the scope and spirit of embodiments of the present disclosure.

At step 205, a low discrepancy sequence of points is obtained. In an embodiment, the low discrepancy sequence is at least one of a deterministic and randomized low discrepancy sequence. In an embodiment, the points are multi-dimensional and one dimension of the point that is assigned to a sample defines a location of the sample.

At step 210, each point in the sequence is assigned to a sample of a plurality of samples according to a space-filling curve to produce sample locations associated with the content. In other words, the space-filling curve is applied to the low discrepancy sequence to enumerate or map points in the low discrepancy sequence to pixel sample locations. In an embodiment, the space-filling curve comprises at least one of a Morton, Hilbert, Moore, and Peano curve. In an embodiment, the space-filling curve connects adjacent pixels that each include at least one of the sample locations.

In an embodiment, one dimension of the points in the low discrepancy sequence is used to partition the low discrepancy sequence into multiple low discrepancy sequences. In an embodiment, each one of the multiple low discrepancy sequences is assigned to compute an integral of multiple integrals using the sample locations. In an embodiment, assignment of the multiple low discrepancy sequences to the multiple integrals is performed by a permutation. In an embodiment, each one of the multiple low discrepancy sequences is assigned to one pixel in the synthesized content.

At step 215, the content is synthesized using the sample locations. In an embodiment, the sample locations are used to evaluate an integral of a function. In an embodiment, the space-filling curve defines an order of single integrals to compute using the sample locations. In other words, the single integral for a light transport path is computed for each sample location. In an embodiment, the single integral computes an attribute of a pixel, such as a color. In an embodiment, the space-filling curve is a shortest route connecting the single integrals (e.g., pixels). In an embodiment, the synthesized content is an image and the function computes a color for the sample location. In an embodiment, the synthesized content is an image and a number of the sample locations within each pixel of the image is fixed. In an embodiment, the synthesized content is an image and a number of the sample locations within each pixel of the image is adaptive.

Figure 2B:
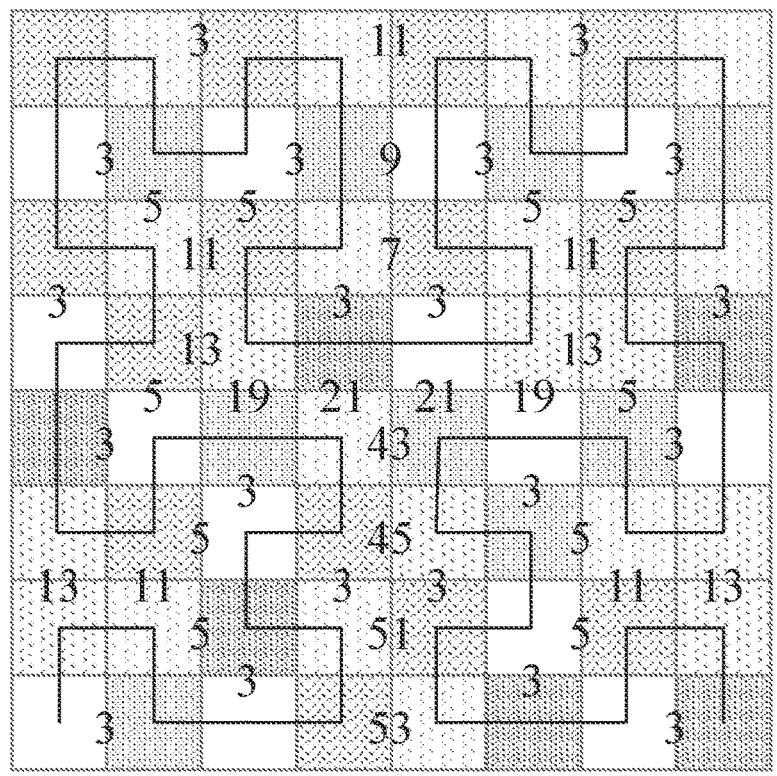
FIGS. 2B, 2C, and 2D illustrate the Hilbert curve superimposed on a pixel grid and pixel index differences corresponding to radical inverses, in accordance with an embodiment.
Figure 2C:
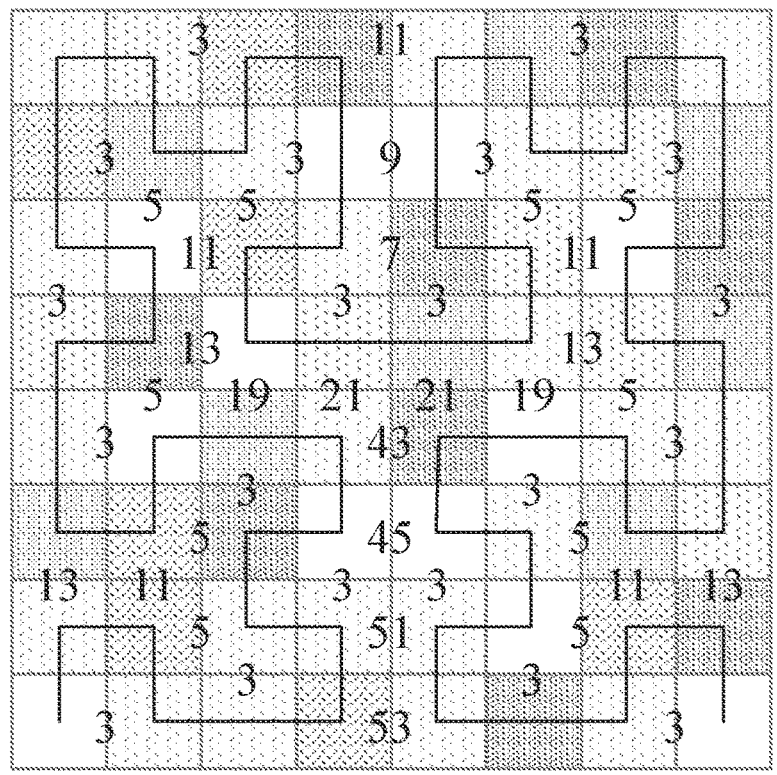
Figure 2D:
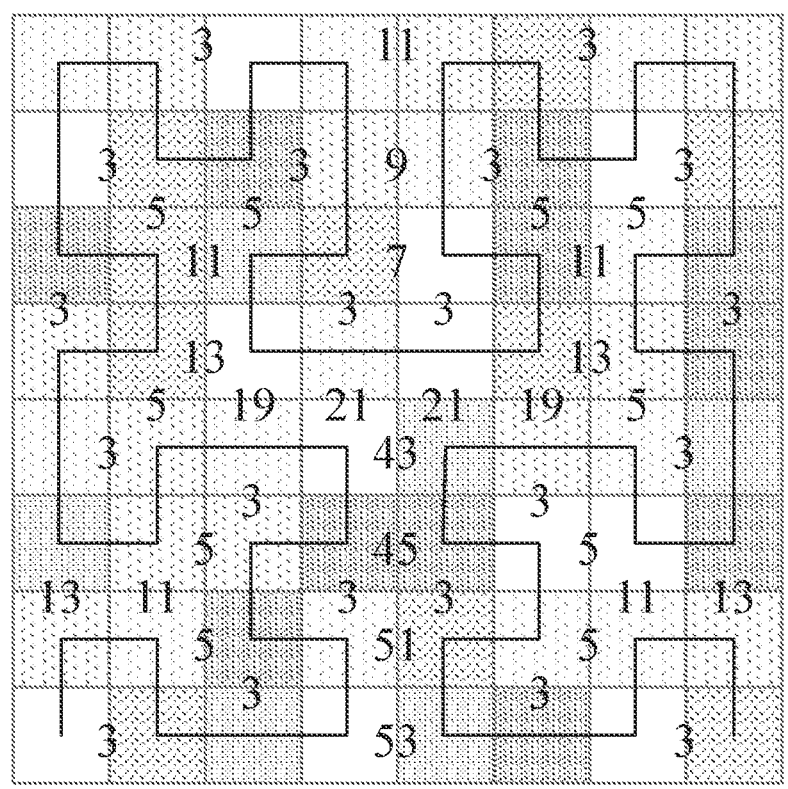

Inter-pixel correlation patterns may be present in the enumerated pixel sample locations. The inter-pixel correlation patterns result from a radical inverse operation that is used to construct certain low discrepancy sequences. A radical inverse operation maps a non-negative integer to a value in the unit interval. FIGS. 2B, 2C, and 2D illustrate the Hilbert curve superimposed on a pixel grid and pixel index differences corresponding to radical inverses, in accordance with an embodiment. Numbers on the edges shared by adjacent pixels are the difference of pixel indices enumerated along the depicted space-filling curve. Along the curve, the difference is one and is implicitly represented by the overlaid space-filling curves. FIG. 2B illustrates the differences for the radical inverse $\phi_2$. A pattern of each pixel represents the value of the radical inverse of the pixel index. FIG. 2C illustrates the differences for the radical inverse $\phi_3$. FIG. 2D illustrates the differences for the radical inverse $\phi_5$. As can be seen in FIGS. 2B, 2C, and 2D, the differences contain symmetries and repetitive patterns, which result in visible correlations in the pixel patterns. A radical inverse maps a non-negative integer to the unit interval by reflecting its digits $a_k(i)$ in base b at the decimal point.

$$\phi_b: \mathbb{N}_0 \to \mathbb{Q} \cap [0,1) i = \Sigma_{k=0}^\infty a_k(i) b^k \mapsto \Sigma_{k=0}^\infty a_k(i) b^{-k-1} \qquad \text{Eq. (1)}$$

The correlation patterns between the space-filling Hilbert curve and a low discrepancy sequence as visualized in FIGS. 2B, 2C, and 2D stem from the nature of radical inversion. In particular, for the Morton curve in base b=2, it is easy to spot a checker-boarding effect.

Each dimension of the Halton low discrepancy sequence is a radical inverse. Each pixel is assigned an index according to the ordering defined by the space-filling curve. When the base b of the space-filling curve equals the difference in indices (shown in FIGS. 2B, 2C, and 2D) there will be correlations between the pixels.

Figure 3A:
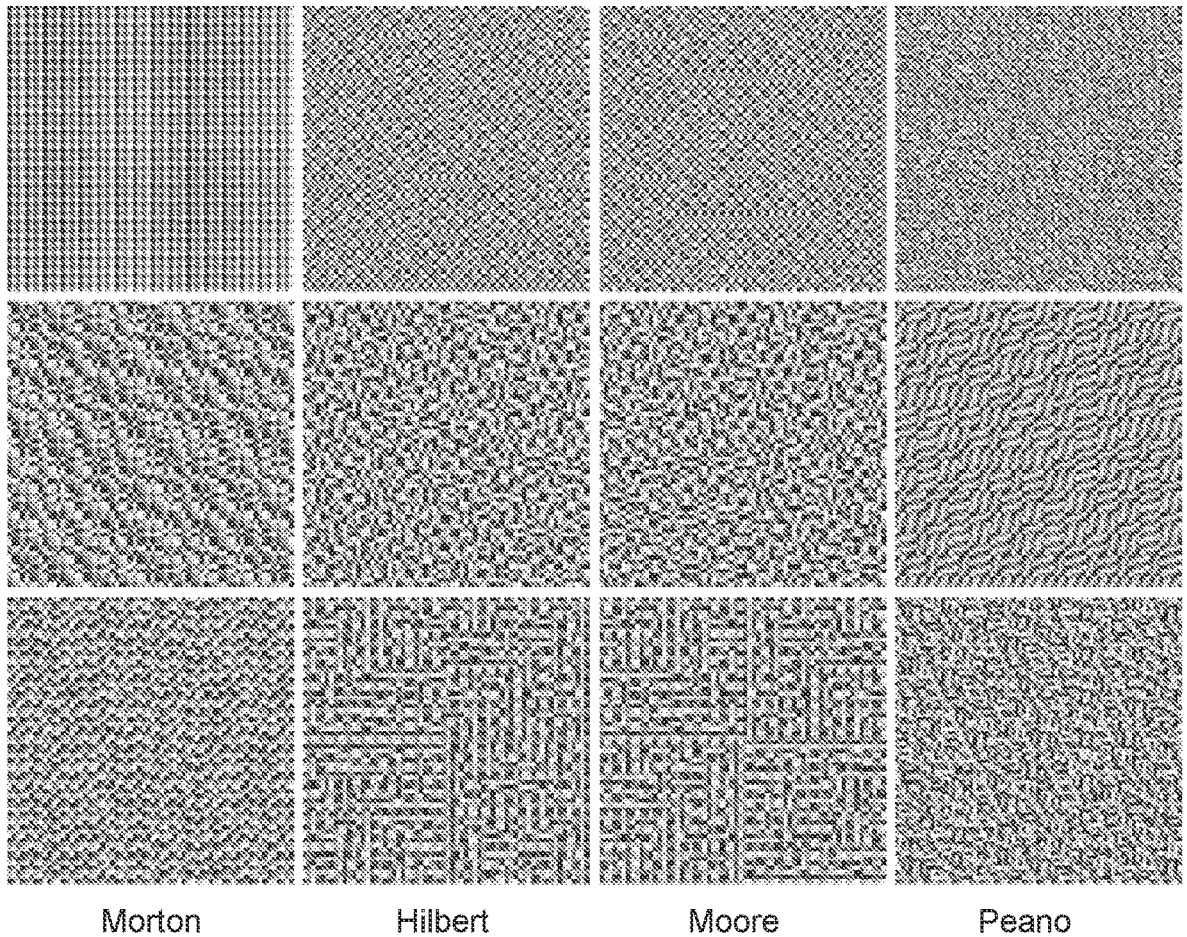
FIG. 3A illustrates correlations of the radical inverses, in accordance with an embodiment.

FIG. 3A illustrates correlations of the radical inverses, in accordance with an embodiment. Each column corresponds to a different space-filling curve. The basis is b=2 for the Morton, Hilbert, and Moore curves and b=3 for the Peano curve. From top to bottom, the basis of the radical inverse is b=2, b=3, and b=5. The pixel resolution for the Morton, Hilbert, and Moore curves in base b=2 is 64×64 pixels, while for the Peano curve in base b=3 is 81×81 pixels. Notice the correlations for Morton, Hilbert, and Moore in the top row and for Peano in the middle row.

Indices for the Morton curve are either odd or even per column of pixels. Consequently, computing the radical inverse 2 of the index, which amounts to bits reversal of the index, results in $\phi_b < \frac{1}{2}$ in even columns and $\phi_b \geq \frac{1}{2}$ in odd columns. Similarly, the second least significant bit of the Morton index is on and off along the rows of pixels. These correlations result in striping artifacts along rows and columns of pixels, especially visible at one sample per pixel (b=2). Correlations appear for the Hilbert and Moore curves as horizontal and vertical lines for $\phi_2$.

Other space-filling curves also expose correlations, the reason being simply that the differences of indices of pixels are deterministic and correlated. FIGS. 2B, 2C, and 2D show the index differences larger than one for adjacent pixels. The Hilbert and Moore curves are in base b=2 and expose correlations with $\phi_3$ and higher bases. For example, in FIG. 3A stripes are visible along lines of differences that are a multiple of the radical inverses' base 3. Similarly, the Hilbert curve has many adjacent pairs of pixels whose differences of indices is 3, and therefore, radical inverses in the adjacent pixel pairs in base b=3 are correlated. The larger the clusters of adjacent pixels having index differences of 3, the more prominent the artifact is.

While correlations are to be expected when the base of the low discrepancy sequence and the space filling curve are not co-prime, correlation structures may become visible whenever the differences of the pixel indices along a space filling curve are correlated to the base of the low discrepancy sequence in a regular way.

To reduce correlation patterns for the sampling, scrambling may be performed during computation of the sample locations. Conventionally, techniques that reduce correlation patterns include randomization, optimization, and the use of lookup tables. In contrast, the algorithms disclosed herein neither require randomization, nor costly optimization, nor lookup tables, but only need to rely on matching properties of the low discrepancy sequence and the space-filling curve.

In an embodiment, scrambling is performed by applying a permutation to the low discrepancy sequence. The Halton sequence is an example of an infinite-dimensional low discrepancy sequence. Each dimension is a radical inverse, where all the bases are relatively co-prime. The uniformity of the simple construction can be improved by applying a permutation to the k-th digit $a_k$ (i) of the index i represented in base b before radical inversion.

Figure 3B:
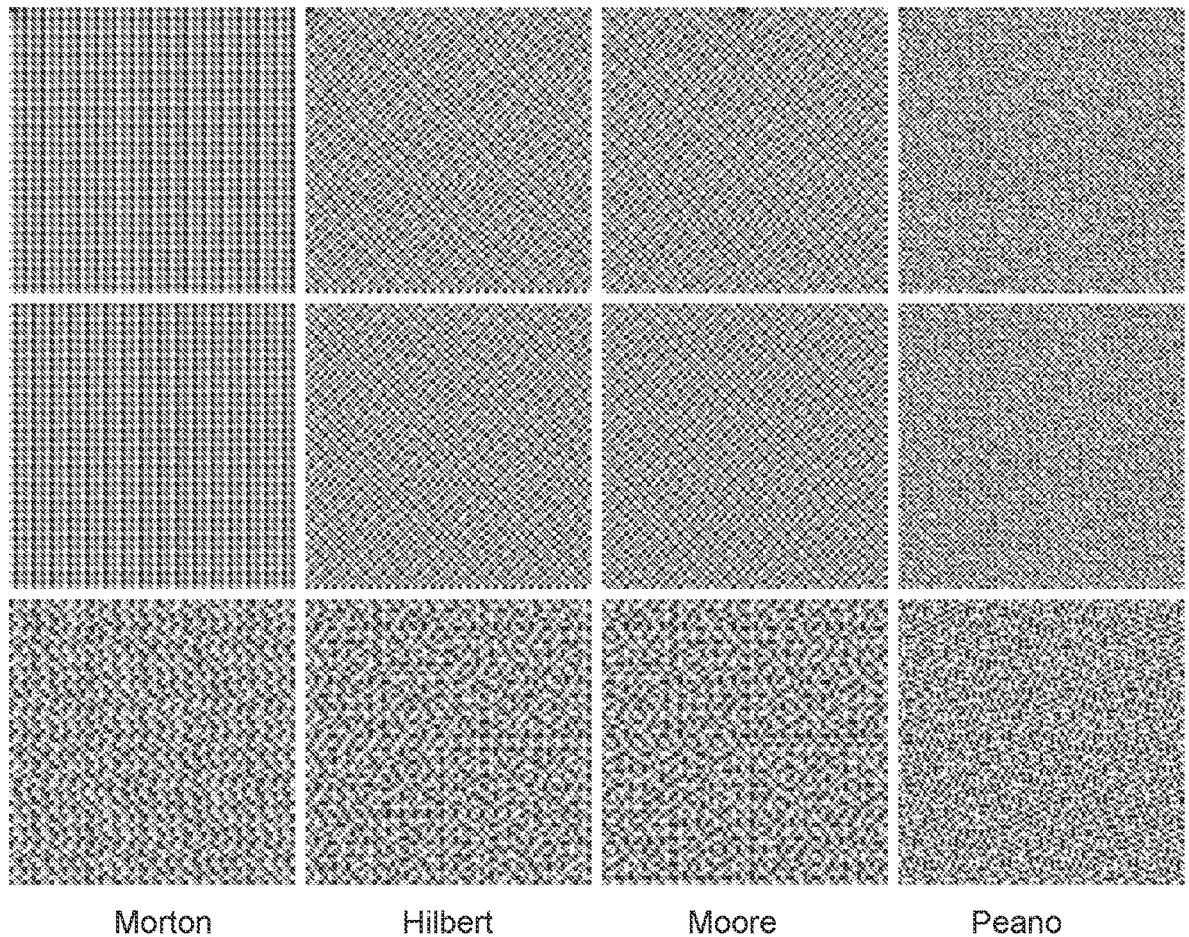
FIG. 3B illustrates scrambling to reduce the correlations shown in FIG. 3A, in accordance with an embodiment.

FIG. 3B illustrates scrambling to reduce the correlations shown in FIG. 3A, in accordance with an embodiment. Each column corresponds to a different space-filling curve. Owen scrambling is used to attenuate, but not completely remove, visible correlations between pixels. Owen scrambling recursively partitions the unit interval and randomly swaps the partitions independently. The top row shows $\phi_2$ with random digit scrambling and the second row shows $\phi_2$ with Owen scrambling. The bottom row shows $\phi_5$ improved according to a technique described by Faure, H., Lemieux, C.: *Improved Halton sequences and discrepancy bounds*. Monte Carlo Methods Appl. 16(3-4), 231-250 (2010). As compared to FIG. 3A, scrambling $\phi_2$ does not at all help when used with the Morton curve and still leaves some visible lines indicative of the quadrant structure of the Hilbert and Moore curves. For the example of $\phi_5$, scrambling helps most for the correlations when using the Peano curve, but does not dramatically attenuate the artifacts when using the other space filling curves.

As exemplified in FIG. 3B, even recursive scrambling cannot remove all correlation artifacts. For example, in base b=2, the recursive structure of scrambling correlates with the block structure of the Morton, Moore, and Hilbert curves. Yet, visible correlation artifacts are attenuated. Note that for the most significant bit, both digit scrambling and Owen scrambling are identical. No matter how or whether the most significant bit is scrambled, consecutive pixels along a space filling curve are hence larger and less than or equal to ½. In contrast to the Morton curve, this guarantees a good uniformity of values in the neighborhood of each pixel for the Hilbert, Moore, and Peano curves. For the example of base b=5, scrambling may attenuate the visible structures and yet cannot resolve the correlations of the base of the radical inverse and the difference of pixel indices as shown in FIGS. 2B, 2C, and 2D.

While some correlations are visible in low dimensions and at low sampling rates, sampling light transport paths requires many more dimensions. The optimization process required by conventional techniques creates blue-noise dither maps, computing and storing blue-noise dither maps as lookup tables. In an embodiment, the values shown in FIGS. 3A and 3B may be used as blue-noise dither maps for rasterizing images. In contrast with using blue-noise dither maps for rendering images via light transport paths, enumerating low discrepancy sequences along a space-filing curve allows one to approximate the desired spectral properties by just selecting components without the restriction to low dimension and without the need to store lookup tables.

When a fixed number of samples per pixel is used to render synthesized content, a set of points in the low discrepancy sequence that includes the number of s-dimensional points is mapped to each pixel in the order determined by the space-filling curve. Progressive image synthesis renders the synthesized content using a dynamic or adaptive number of samples for each pixel. Progressive or adaptive sampling maps one point (vector) in the low discrepancy sequence to each pixel in the order determined by the space-filling curve and repeats until a given sample or time budget is reached or terminates sampling once a selected image quality has been reached.

In an embodiment, a deterministic Cranley-Patterson rotation is used to perform progressive sampling. A first low discrepancy sequence is enumerated along a space-filling curve to produce a first set of samples (e.g., one sample location per pixel). One second low discrepancy sequence is then enumerated per pixel and the sample assigned to the respective pixel from the first set of samples is used to shift each respective sample in the second set of samples to produce at least one additional sample location per pixel. The shifting operation performs the deterministic Cranley-Patterson rotation.

The Cranley-Patterson rotation is implemented as component-wise addition modulo one to shift each sample (rotate on a torus). More specifically, the first set of samples is used as a shift for the samples per pixel drawn from the second sequence. The shift is performed modulo 1, i.e. on a torus such that numbers never exceed 1. The image of shifting points of the torus in fact looks like a rotation on the surface of a torus and that is why the term "rotation" is used. Yet, shifting a low discrepancy sequence by vectors from the same sequence may expose visible correlation artifacts at low sampling rates. This is the case when enumerating the improved Halton sequence along the Hilbert curve to shift the same sequence per pixel. While Cranley-Patterson rotations work with any point set, the Cranley-Patterson rotations work best using a point set designed for the unit torus such as rank-1 lattices and rank-1 lattice sequences as the second low discrepancy sequence.

Good generator vectors for rank-1 lattice sequences exist but are usually hard to construct using means of number theory and functional analysis. The quality of a generator vector is determined by figures of merit, including the computation of test integrals whose analytic solution is known and thus allows for determining the integration error. As it turns out, most random generator vectors are good. In an embodiment, the low discrepancy sequence is realized by a rank-1 lattice sequence with random generator vector. In one embodiment, a sequence of random numbers is used as a generator vector. In yet another embodiment, each pixel uses an own random generator vector for its associated rank-1 lattice sequence. For a rank-1 lattice sequence in base 2, where the radical inverse in base 2 is used for generation, the resulting rank-1 lattice sequence is a Latin hypercube sample for powers of 2 points whenever the components of the generator vector are co-prime to the base of generation, i.e., base 2. This is easily realized by a random generator vector, where the components are twice the random number plus one, i.e., odd. In such a Latin hypercube sample, each dimension is perfectly stratified, which is highly desirable with respect to convergence. On a computer, a random number may be mimicked by a pseudo-random number generator.

Array-RQMC algorithms may be used to randomize the same low discrepancy sequence for each iteration of enumerating samples during progressive sampling. When a fixed number of samples are used to render images, for each frame, the low discrepancy sequence is randomized and the rendered frames are accumulated until the termination by an empirical error criterion is triggered or a given time budget expires. The repeated randomization will eventually average out the correlation artifacts. While randomizing the low discrepancy sequence and accumulating results is unbiased and allows for unbiased variance estimation, some uniformity and hence convergence speed is sacrificed. Therefore, a deterministic and consistent algorithm is desired, which in addition is simpler to execute and reproduce on massively parallel computer systems.

An alternative to randomizing the low discrepancy sequence, is to simply reuse the low discrepancy sequence. To increase the uniformity of the samples in a pixel, one approach for progressive sampling is to double the sampling rate with each iteration. While randomizing the low discrepancy sequence freshly for each iteration produces an unbiased result, not randomizing preserves more uniformity. A deterministic variant of the sample enumeration algorithm sequentially consumes the points of the low discrepancy sequence along the space-filling curve according to the selected number of samples per pixel for each iteration. The segment lengths drawn from the sequence are a multiple of the length of the selected space-filling curve. In two dimensions, the length is a quadratic power of the base of the selected space-filling curve.

For the example of base two, segment lengths amount to multiples of powers of two. Hence, for a specific pixel, samples drawn from a radical inverse in base b=2 are spaced in multiples of powers of two, which will reveal correlation artifacts as visualized in FIGS. 2B, 2C, and 2D. Depending on the combination of space-filling curve and component of the low discrepancy sequence, samples may even not be distributed uniformly. Omitting the components of the low discrepancy sequence that correlate with the space-filling curve may help, but as previously explained, there may be multiple components with correlations.

Partitioning a low discrepancy sequence into a finite number of low discrepancy sequences may be used where one dimension of a low discrepancy sequence is used for partitioning, while the remaining dimensions are used for quasi-Monte Carlo integration. A partitioning principle may be used to develop a simple consistent algorithm for rendering along the Hilbert curve.

Let $\phi_b$ be the component of a low discrepancy sequence to be partitioned into $N=b^m$ (where N is the number of pixels) low discrepancy sequences and let $x_i$ be the points of the low discrepancy sequence without the component used for partitioning. Then the integers $$\lfloor N \cdot \phi_b(i) \rfloor = \lfloor b^m \cdot \phi_b(i) \rfloor = \lfloor b^m \cdot \Sigma_{k=0}^{\infty} a_k(i) b^{-k-1} \rfloor, \quad \text{Eq. (2)}$$

form a permutation of $\{0, \ldots, N-1\}$ that repeats every N points. Selecting N as the length of a space filling curve and b its base, each pixel with index j along the space-filling curve is assigned the sequence of points $$P_j = \left\{ x_{l \cdot N + \phi_b^{-1}\left(\frac{j}{N}\right)} : l \in \mathbb{N}_0 \right\} \Leftrightarrow P_{\phi_b^{-1}\left(\frac{j}{N}\right)} = \{x_{l \cdot N + j} : l \in \mathbb{N}_0\} \quad \text{Eq. (3)}$$

of the original low discrepancy sequence $x_i$, which results in an overall consistent deterministic quasi-Monte Carlo algorithm.

As the offset $$\phi_b^{-1}\left(\frac{j}{N}\right)$$

is constant per pixel, omitting the inverse of the permutation $\lfloor b^m \cdot \phi_b(i) \rfloor$ and instead assigning $$P_j = \{x_{l \cdot N + j} : l \in \mathbb{N}_0\} \quad \text{Eq. (4)}$$

simplifies the implementation: Now contiguous blocks of the low discrepancy sequence are enumerated along the space-filling curve and an additional benefit of locally improved uniformity is achieved.

For the combination of the Hilbert curve and the improved Halton sequence for progressive image synthesis, b=2 and $\phi_2$ is used to partition the low discrepancy sequence into $N=2^{2n}$ low discrepancy sequences, one for each pixel along the Hilbert curve. The algorithm uses the pixel index j along the Hilbert curve as offset into the low discrepancy sequence $x_i$ and leapfrogs from there with a stride of N, which is simple to execute on a massively parallel computer system, like for example a GPU cluster.

Figure 3C:
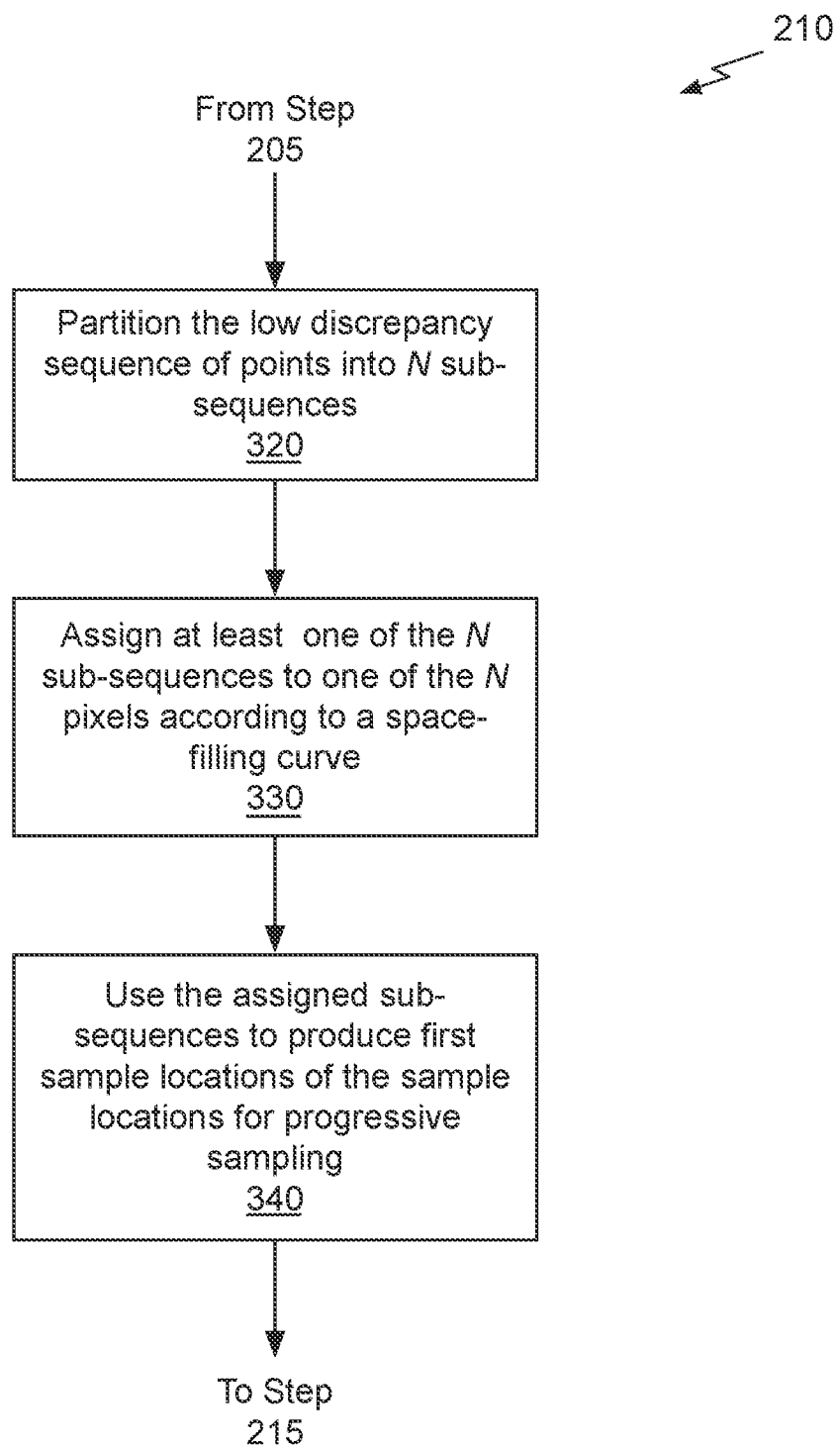
FIG. 3C illustrates a flowchart of a method for performing a step shown in FIG. 2A for use in implementing some embodiments of the present disclosure.

FIG. 3C illustrates another flowchart of a method for performing step 210 of the method 200 for use in implementing some embodiments of the present disclosure. Each block of step 210, described herein, comprises a computing process that may be performed using any combination of hardware, firmware, and/or software. Furthermore, persons of ordinary skill in the art will understand that any system that performs method 200 is within the scope and spirit of embodiments of the present disclosure.

At step 320 the low discrepancy sequence of points is partitioned into N sub-sequences that each include a portion of the low discrepancy sequence, where N is the number of pixels in the synthesized content. In an embodiment, the sequence of points is infinite by construction, so all of the points are not needed. At step 330, at least one of the N sub-sequences is assigned to one pixel according to a space-filling curve. At step 340, the assigned sub-sequences are used to produce first sample locations of sample locations for progressive sampling and the method proceeds to step 215. The steps 320, 330, and 340 may be executed in parallel for the N pixels to enumerate the number of samples. When the number of samples per pixel is adaptive, step 340 determines if a sample or time budget is reached or a selected image quality has been reached.

Rendering images by enumerating pixels along the Hilbert curve improves performance by higher cache hit rates due to the locality properties of the Hilbert curve. Enumerating samples along the space-filling curve is a special case of Array-RQMC randomization that does not require sorting, instead relying on the bijection between pixels and the space-filling curves. As indices can be computed directly, neither lookup tables nor additional memory for lookup tables are required. Furthermore, the enumeration of samples along the space-filling curve is a deterministic algorithm that can be reliably parallelized and provide results that are exactly reproducible.

An advantage of the enumeration of samples along the space-filling curve is inherited from Array-RQMC: As illustrated in FIG. 1A, the Hilbert curve has the smallest number of curve segments in the neighborhood around a pixel. Hence more consecutive samples are used locally, which makes better use of the uniformity of a low discrepancy sequence across pixels as compared to other space-filling curves. Therefore, the noise in the images is more uniformly distributed noise at low sampling rates.

Enumerating samples along the space-filling curve achieves a quality comparable to methods that require optimization, are available for any number of dimensions, are simpler than other approaches that sample along space-filling curves, are deterministic, and are consistent. In an embodiment, the dimensions of low discrepancy sequences are selected or reordered. The enumeration technique may include one or more of scrambling, Cranley-Patterson rotations, randomization, and partitioning. These different variations provide simple deterministic consistent rendering algorithms that, at low sampling rates, produce noise characteristics that are very amenable to the human eye. Time consuming optimizations are not required to reduce undesirable inter-pixel correlations, so the algorithm may be performed in real-time. Key to the algorithms is preservation of discrepancy when enumerating low discrepancy sequences along a space-filling curve and the principle of partitioning one low discrepancy sequence into multiple sub-sequences. The correlation of samples across pixels via low discrepancy may be more relevant to the eye than independence of the pixels.

Parallel Processing Architecture

Figure 4:
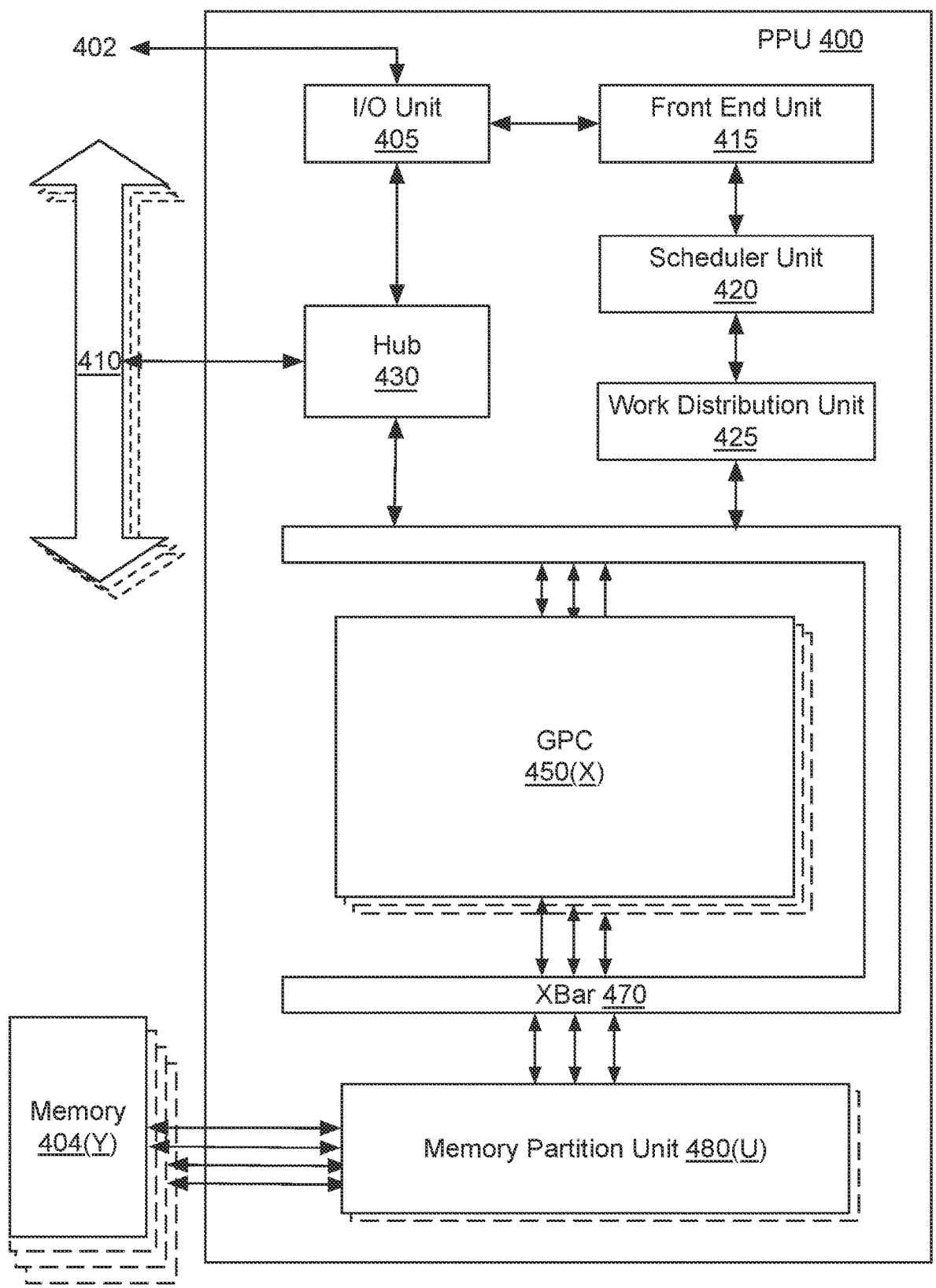
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to enumerate samples of a low discrepancy sequence along a space filling curve, in accordance with an embodiment. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in an L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the GPCs 450 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
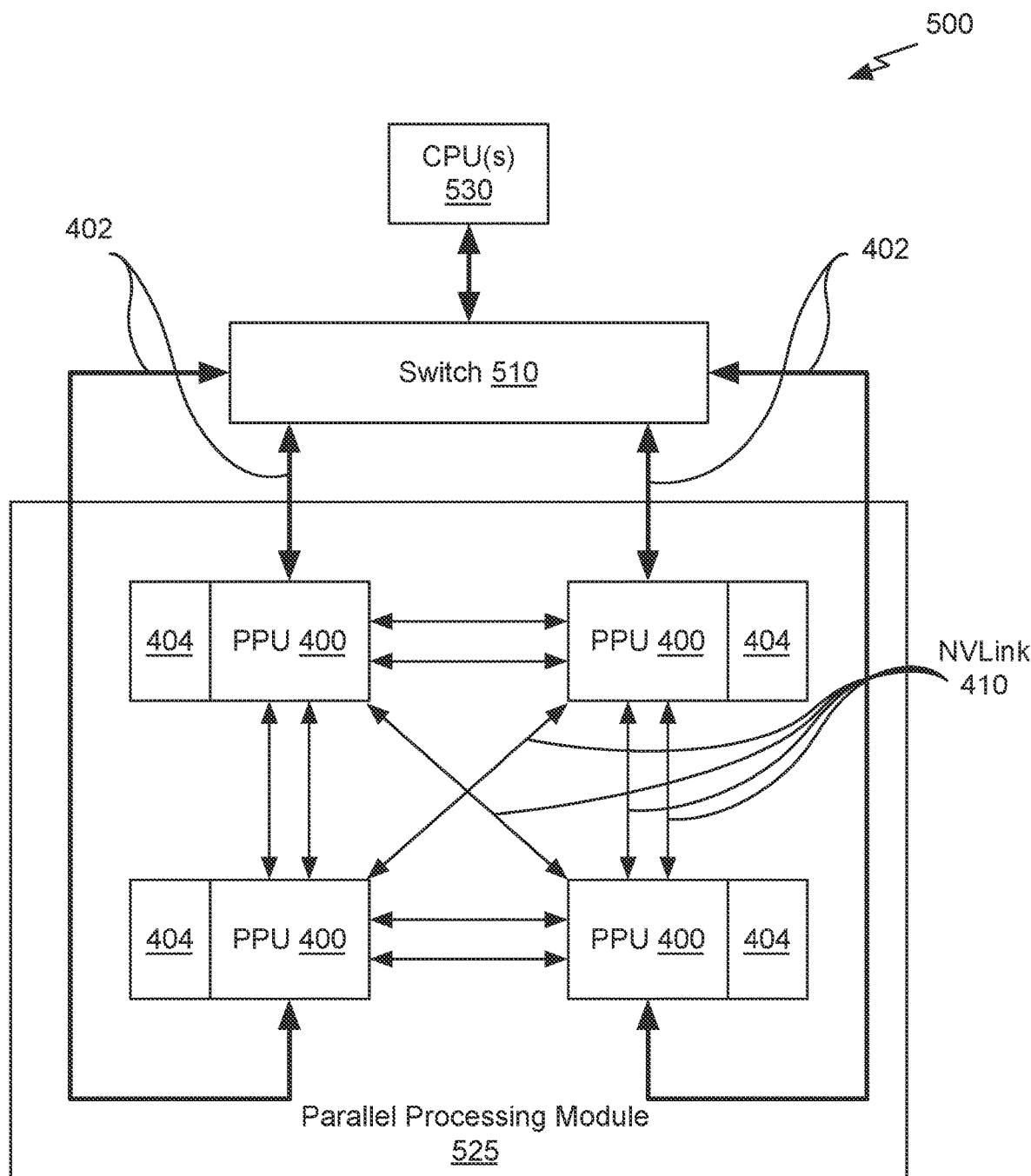
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to enumerate samples of a low discrepancy sequence along a space filling curve. The processing system 500 includes a CPU 530, switch 510, and multiple PPUs 400, and respective memories 404.

Figure 5B:
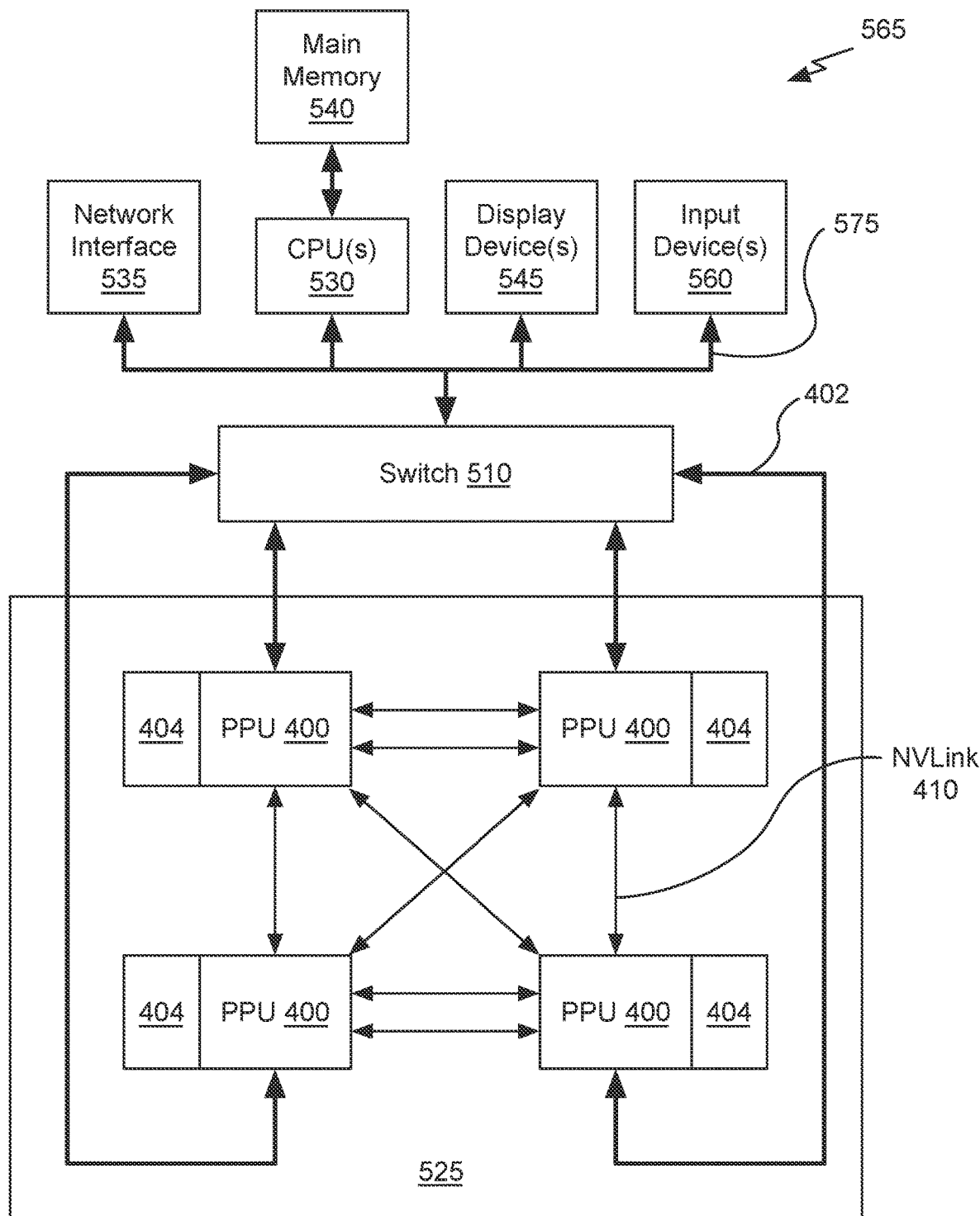
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to enumerate samples of a low discrepancy sequence along a space filling curve. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
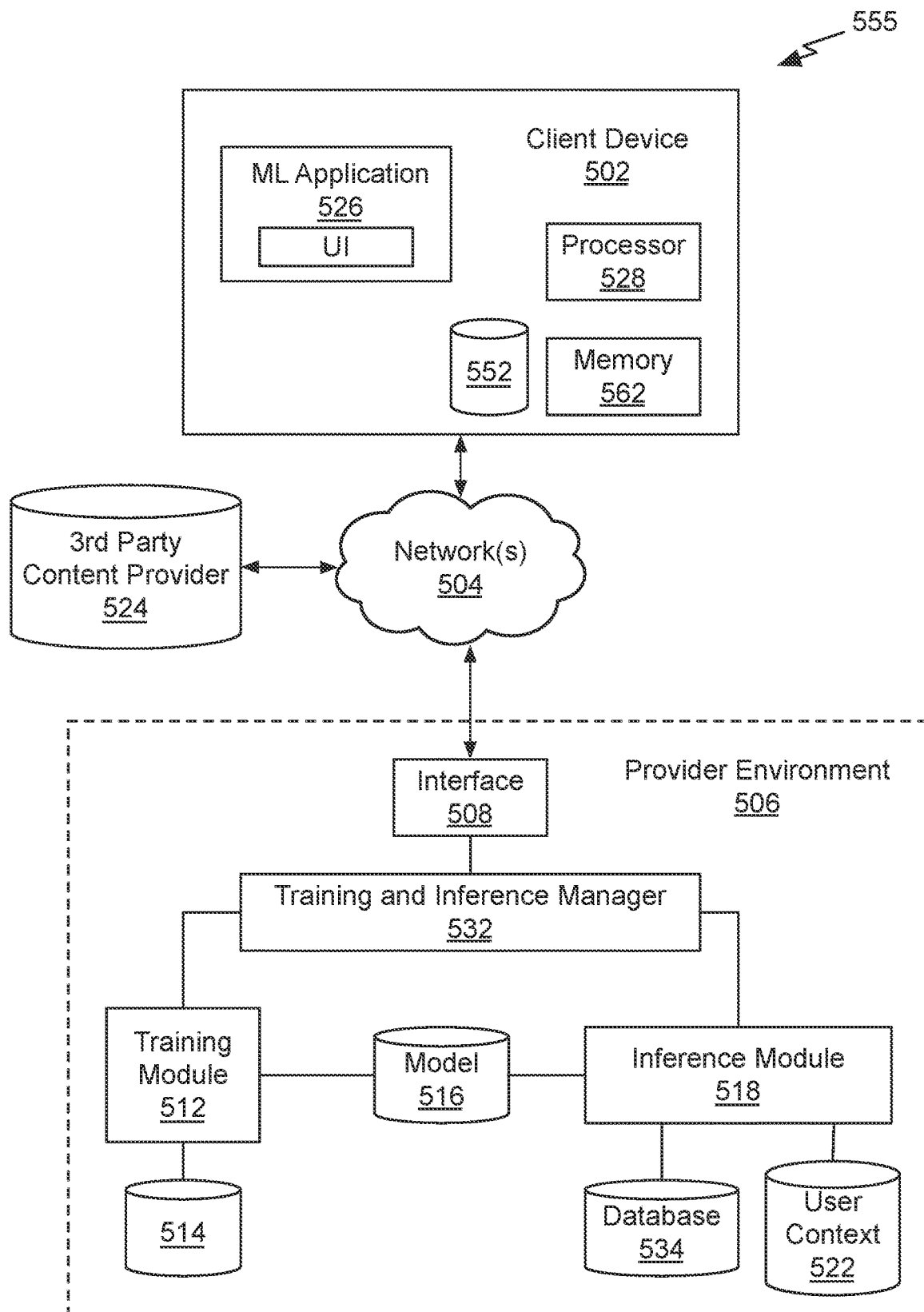
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
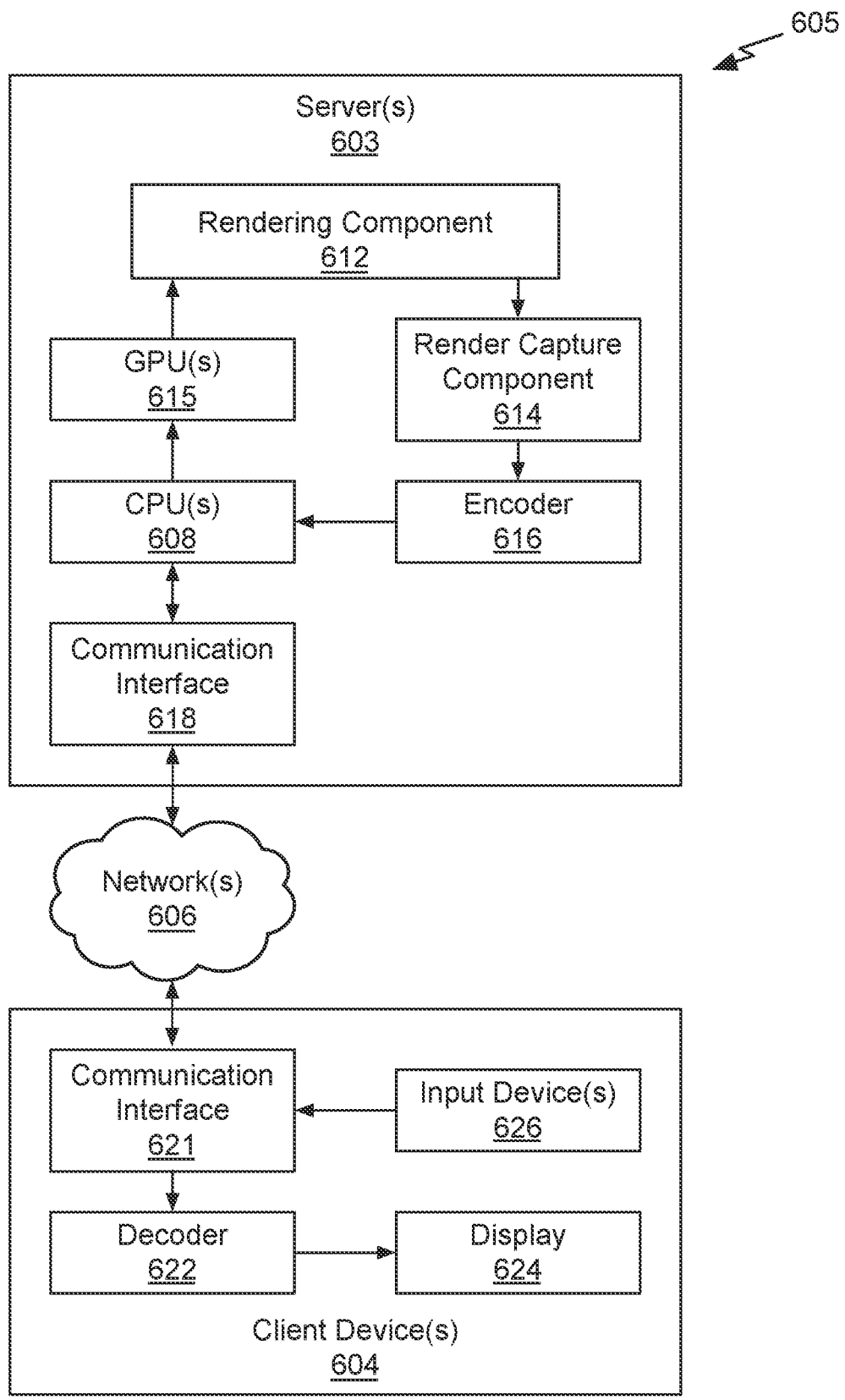
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for synthesizing content, comprising:
   obtaining a low discrepancy sequence of points;
   assigning each point in the low discrepancy sequence to a sample of a plurality of samples according to a space-filling curve to produce sample locations associated with the content, wherein the space-filling curve is a shortest route connecting single integrals; and
   synthesizing the content by computing the single integrals for the sample locations to generate an image.

2. The computer-implemented method of claim 1, wherein the single integral is associated with a function.

3. The computer-implemented method of claim 2, wherein the function computes a color for the sample location.

4. The computer-implemented method of claim 1, wherein the low discrepancy sequence is at least one of a deterministic and randomized low discrepancy sequence.

5. The computer-implemented method of claim 1, wherein the low discrepancy sequence is realized by a rank-1 lattice sequence with random generator vector.

6. The computer-implemented method of claim 1, wherein the space-filling curve comprises at least one of a Morton, Hilbert, Moore, and Peano curve.

7. The computer-implemented method of claim 1, wherein the space-filling curve defines an order in which the points are assigned to the plurality of samples.

8. The computer-implemented method of claim 1, wherein the points are multi-dimensional and one dimension of the points in the low discrepancy sequence is used to partition the low discrepancy sequence into multiple low discrepancy sequences.

9. The computer-implemented method of claim 8, wherein each one of the multiple low discrepancy sequences is assigned to compute an integral of multiple integrals using the sample locations.

10. The computer-implemented method of claim 9, wherein assignment of the multiple low discrepancy sequences to the multiple integrals is performed by a permutation.

11. The computer-implemented method of claim 10, wherein the permutation is defined by the space-filling curve.

12. The computer-implemented method of claim 1, wherein a number of the sample locations within each pixel of the image is fixed.

13. The computer-implemented method of claim 12, wherein the assigning further comprises:
   assigning each point in an additional low discrepancy sequence to an additional sample of the plurality of samples according to the space-filling curve; and
   modifying each additional sample using a respective sample assigned to one of the points in the low discrepancy sequence to produce additional sample locations associated with the content.

14. The computer-implemented method of claim 1, wherein a number of the sample locations within each pixel of the image is adaptive.

15. The computer-implemented method of claim 1, wherein at least one of the steps of obtaining, assigning, and synthesizing are performed on a server or in a data center to generate the image and the image is streamed to a user device.

16. The computer-implemented method of claim 1, wherein at least one of the steps of obtaining, assigning, and synthesizing are performed within a cloud computing environment.

17. The computer-implemented method of claim 1, wherein at least one of the steps of obtaining, assigning, and synthesizing are performed for training, testing, or certifying a neural network employed in a machine, robot, or autonomous vehicle.

18. The computer-implemented method of claim 1, wherein at least one of the steps of obtaining, assigning, and synthesizing is performed on a virtual machine comprising a portion of a graphics processing unit.

19. A system, comprising:
   a memory that stores a low discrepancy sequence of points; and
   a processor that is connected to the memory and configured to:
   assign, each point in the sequence to a sample of a plurality of samples according to a space-filling curve to produce sample locations associated with the content, wherein the space-filling curve is a shortest route connecting single integrals; and
   synthesizing the content by computing the single integrals for the sample locations to generate an image.

20. The system of claim 19, wherein the sample locations are used to evaluate a single integral is associated with a function.

21. A non-transitory computer-readable media storing computer instructions that, when executed by one or more processors, cause the one or more processors to perform the steps of:
   obtaining a low discrepancy sequence of points;
   assigning, each point in the sequence to a sample of a plurality of samples according to a space-filling curve to produce sample locations associated with the content, wherein the space-filling curve is a shortest route connecting single integrals; and
   synthesizing the content by computing the single integrals for the sample locations to generate an image.

22. The non-transitory computer-readable media of claim 21, wherein the points are multi-dimensional and one dimension of the points in the low discrepancy sequence is used to partition the low discrepancy sequence into multiple low discrepancy sequences.

\* \* \* \* \*